(12) United States Patent
Feijen et al.

(10) Patent No.: US 8,870,496 B2
(45) Date of Patent: Oct. 28, 2014

(54) OFFSHORE S-LAY PIPELAYING VESSEL

(75) Inventors: Arnoud Laurens Feijen, Rotterdam (NL); Terence Willem August Vehmeijer, The Hague (NL); Joop Roodenburg, Delft (NL)

(73) Assignee: Itrec B.V., Schiedam (NL)

( * ) Notice: Subject to any disclaimer, the term of this patent is extended or adjusted under 35 U.S.C. 154(b) by 247 days.

(21) Appl. No.: 13/391,187

(22) PCT Filed: Aug. 19, 2010

(86) PCT No.: PCT/NL2010/050520
§ 371 (c)(1),
(2), (4) Date: May 4, 2012

(87) PCT Pub. No.: WO2011/021935
PCT Pub. Date: Feb. 24, 2011

(65) Prior Publication Data
US 2012/0219362 A1 Aug. 30, 2012

(30) Foreign Application Priority Data

Aug. 21, 2009 (NL) .................................... 2003377

(51) Int. Cl.
*F16L 1/225* (2006.01)
*F16L 1/20* (2006.01)
*F16L 1/18* (2006.01)

(52) U.S. Cl.
CPC . *F16L 1/225* (2013.01); *F16L 1/20* (2013.01); *F16L 1/202* (2013.01); *F16L 1/18* (2013.01)

USPC .......................................................... 405/166

(58) Field of Classification Search
USPC .......................................................... 405/166
See application file for complete search history.

(56) References Cited

U.S. PATENT DOCUMENTS

| 3,641,779 | A | 2/1972 | Koop, Jr. et al. |
| 5,011,333 | A | 4/1991 | Lanan |
| 5,857,715 | A | 1/1999 | Gray et al. |
| 2007/0098504 | A1 | 5/2007 | Roodenburg et al. |

FOREIGN PATENT DOCUMENTS

| DE | 3514799 A1 | 10/1986 |
| WO | WO 94/19637 A1 | 9/1994 |
| WO | WO 96/08605 A2 | 3/1996 |
| WO | WO 2006/085739 A1 | 8/2006 |
| WO | WO 2007/000609 A2 | 1/2007 |
| WO | WO 2008/156352 A1 | 12/2008 |
| WO | WO 2009/098586 A2 | 8/2009 |

*Primary Examiner* — Benjamin Fiorello
*Assistant Examiner* — Kyle Armstrong
(74) *Attorney, Agent, or Firm* — Birch, Stewart, Kolasch & Birch, LLP

(57) ABSTRACT

An offshore S-lay pipelaying vessel for laying a pipeline on the seabed, said vessel comprising: —a hull; —an elongated stinger having a hull end and a free end, said stinger being adapted to support the pipeline to be laid from the vessel, wherein the stinger comprises a stinger frame, possibly composed of one or more rigid stinger frame sections, possibly articulated sections, and wherein—distributed over the length of the stinger—multiple pipeline support assemblies are mounted to the stinger frame that provide support for the pipeline.

14 Claims, 12 Drawing Sheets

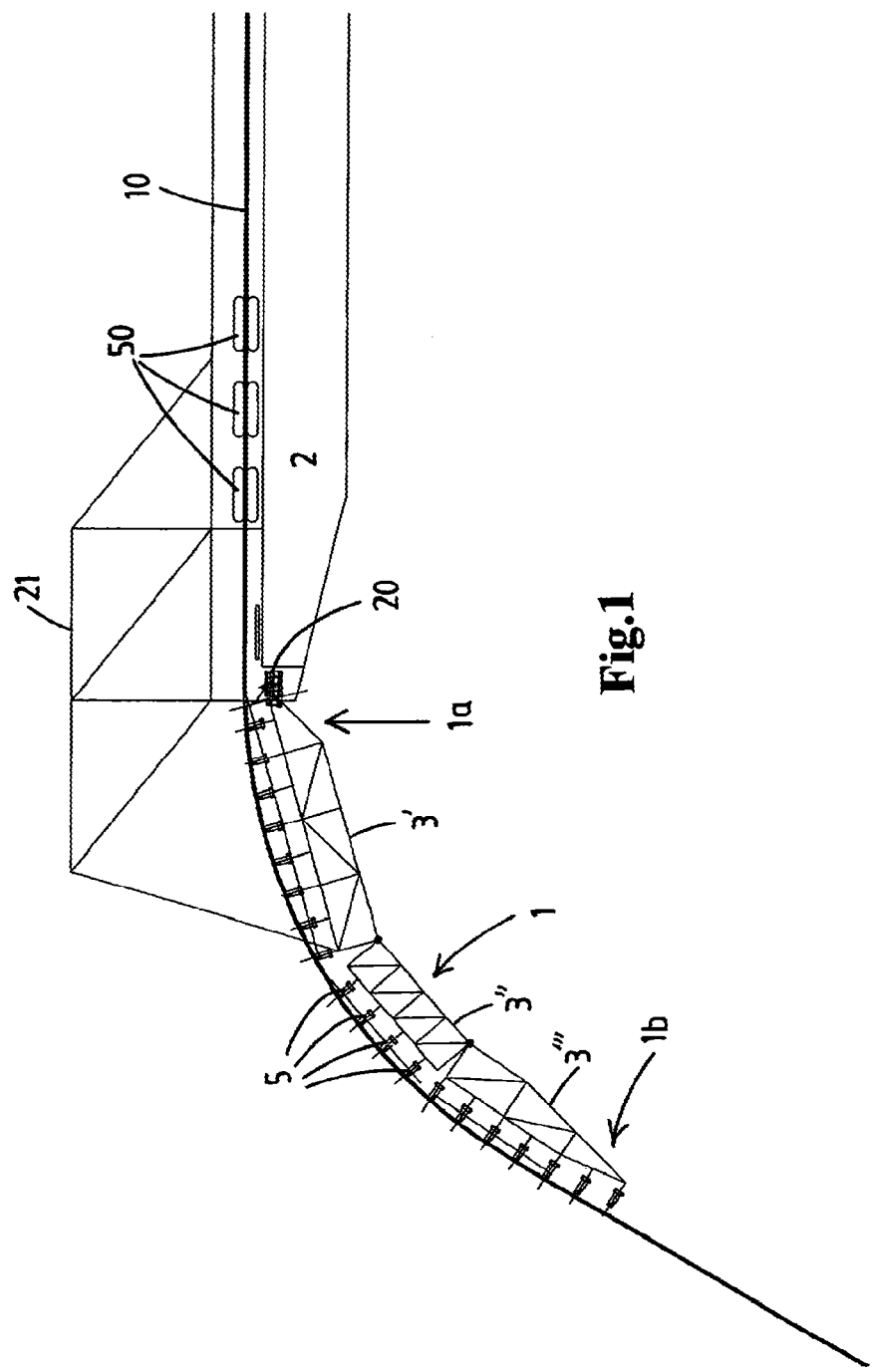

OFFSHORE S-LAY PIPELAYING VESSEL

Figure 2C:
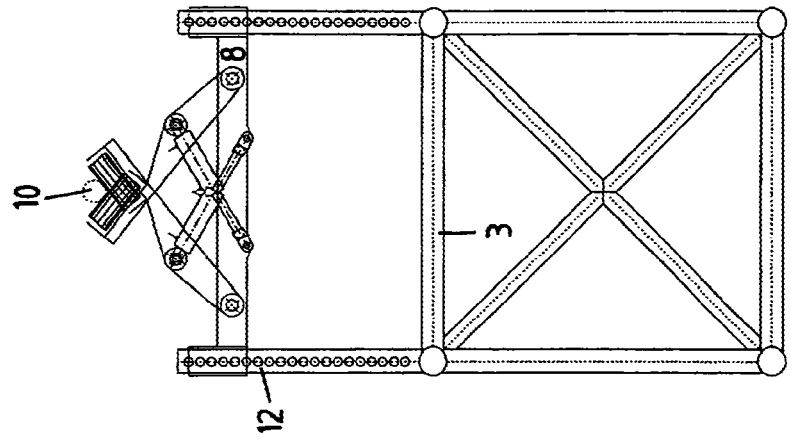

The present invention relates to an offshore S-lay pipelaying vessel for laying a pipeline on the seabed. S-laying is a well known technique for laying a pipeline on the seabed. An S-lay pipelaying vessel is commonly equipped with an elongated stinger that supports the pipeline to be laid.

The present invention also relates to an S-lay stinger for use with an S-lay pipelaying vessel.

Developments in the field of pipelaying nowadays allow for S-lay pipelaying in deep water of large diameter pipeline. As a result the weight of the pipeline suspended between the vessel and the seabed is enormous, requiring massive stingers and making the passage of the pipeline over the stinger an even more critical event than in the past.

A further development in the field of pipelaying is the integration of accessories into the pipeline to be laid, an accessory having cross-sectional dimensions significantly greater than the pipeline itself. Notably pipelines are to be fitted with so-called Pipeline End Terminals (PLET's) or intermediate Pipeline accessories, e.g. having one or more valves and/or one or more pipeline branches, e.g. a pipeline tie-in accessory.

In WO2006/085739 an S-lay pipelaying vessel is disclosed provided with one or more tensioners as well as with a pipeline clamp downstream of the tensioners, just in front of the hull end of the stinger. It is disclosed that an accessory may be fitted into or on an end of the pipeline to be laid. This is done at a station between the pipeline clamp and the tensioner, allowing—when needed—to support the pipeline by means of said pipeline clamp. After the accessory has been fitted onto the pipeline, the (further) launching of the pipeline will involve passing the accessory over the stinger.

Common stingers impose restrictions on the accessory that can pass over the stinger. U.S. Pat. No. 5,857,715 discloses an accessory that is dimensioned to pass over a common stinger.

Developments in the field nowadays call for accessories to be fitted in the pipeline that can not be adequately passed over existing stingers. For instance an accessory may have a bottom side that is located more than 1 meter, e.g. between 1 and 2.5 meters, below the centreline of the pipeline. The bottom width of the accessory may be between 3 and 6 meters and the accessory height may be between 3 and 6 meters. The length of the accessory may well be between 5 and 10 meters.

As the passage of the pipeline over the stinger already is a critical event, even without the presence of an accessory, it is found that available stinger designs as well as available methods for launching a pipeline equipped with an accessory along a stinger of an S-lay pipelaying vessel are inadequate. As a consequence nowadays such accessories are fitted on the pipeline with techniques such as wherein a point of the already launched pipeline is raised and brought to another location of the vessel, e.g. at a side of the vessel, using a crane and then the accessory is fitted. The pipeline is then lowered again, and the pipelaying resumed.

The present invention aims to provide improvements allowing the efficient S-laying of pipeline with one or more accessories of substantial size fitted on the pipeline.

The present invention aims to provide improvements with regard to the stinger allowing the passage of a pipeline with an accessory of substantial size fitted on the pipeline.

The present invention aims to provide alternative S-lay vessel designs allowing for the fitting of an accessory of substantial size on the pipeline, and the efficient launching of the pipeline with said accessory along the stinger.

The present invention aims to provide techniques to be used on an S-lay vessel for the efficient launching of a pipeline fitted with an accessory along the stinger.

The present invention also aims to provide an improved stinger to be used in combination with an (existing) S-lay pipelaying vessel.

Multiple solutions are mentioned herein in order to achieve one or more of the above aims.

According to a first aspect thereof the invention relates to an offshore S-lay pipelaying vessel for laying a pipeline on the seabed, said vessel comprising:
a hull;
an elongated stinger having a hull end and a free end, said stinger being adapted to support the pipeline to be laid from the vessel,
wherein the stinger comprises a stinger frame, possibly composed of one or more rigid stinger frame sections, possibly articulated sections,
and wherein—distributed over the length of the stinger—multiple pipeline support assemblies are mounted that provide support for the pipeline.

A pipeline support assembly commonly comprises multiple rollers, e.g. arranged in a V-shape or U-shape. Multiple sets of such rollers, arranged one behind the other in longitudinal stinger direction, are often mounted on a common base of the support assembly. Instead of rollers also endless tracks or even glide shoes can be envisaged for the pipeline support, although preference is given to the use of rollers.

The first aspect provides for improvements of the stinger of such a vessel.

In a preferred embodiment the pipeline support assemblies are movably mounted with respect to the stinger frame so as to allow for different positions with respect to the stinger frame,
wherein a position actuator is associated with each movable pipeline support assembly adapted to arrange the pipeline support assembly into a selected position,
and wherein said position actuator is preferably remotely operable from the vessel, preferably a control system being provided controlling the operation of all position actuators. The different positions can be beneficial e.g. when pipelines of different diameters are used.

Preferably, the S-lay vessel allows for the passage of an accessory mounted on said pipeline having a cross-section greater than said pipeline diameter, wherein the pipeline support assemblies are movably mounted with respect to the stinger frame so as to allow for different positions with respect to the stinger frame, at least from a pipeline support position in which the pipeline is supported by the pipeline support assemblies to an accessory support position to allow for the passage of the accessory, the pipeline support assembly in said accessory support position supporting or at least guiding the accessory. This means that a pipeline support assembly that is moved away from its pipeline support position upon arrival of the oversized accessory, is preferably actuated by the associated position actuator to move into a preferably predetermined, accessory support position.

The above indicated features e.g. advantageous when used in combination. Thus, the vessel is embodied to allow for causing a position actuator to move the associated pipeline support assembly from the pipeline support position to the accessory support position; and after said accessory has passed the pipeline support assembly moving said pipeline support assembly back to the pipeline support position. This means that upon arrival of the accessory at the location of a support assembly said assembly is moved away from the pipeline such as to allow for the passage of the accessory, and once the accessory has passed said support assembly, the position actuator is operated to bring said support assembly again in its pipeline supporting position. In a preferred embodiment the control system is adapted to perform this operation in automated manner, e.g. based on input representative of the actual position of the accessory along the stinger.

The above mentioned approach is performed preferably such that the pipeline is supported by the maximum number of pipeline support assemblies, only those "covered" by the accessory being in a "retracted position". It will be appreciated that the length of the accessory, in combination with the longitudinal spacing between adjacent pipeline support assemblies is such that at one moment multiple pipeline support assemblies are retracted.

When considered during actual pipelaying and passing an accessory over the stinger whilst the pipeline is duly supported by the stinger, the motion of the pipeline support assemblies will resemble a peristaltic motion.

In a preferred embodiment the longitudinal spacing between adjacent movable pipeline support assemblies is less than 5 meters, e.g. between 2 and 4 meters. With a length of an accessory of 8 meters this means that the pipeline can remain supported fairly close to the upstream and the downstream end of the accessory. It is noted that in existing stingers said spacing may well be between 8 and 10 meters, so that upon retracting of a single pipeline support assembly for passage of an accessory, the pipeline is only supported at positions that are 16-20 meters apart. By reducing the longitudinal spacing, said length can be reduced, which is beneficial in view of pipeline stresses.

In a preferred embodiment a pipeline support assembly includes rollers arranged in V-shape when supporting the pipeline. In a more preferred embodiment, in view of the above, these rollers are movable from said V-shaped position into an accessory support position, e.g. by tilting outwards, e.g. to a position wherein the rollers contact the bottom side, e.g. guide rails on the bottom side, of the accessory. In an embodiment it is envisaged that the rollers are brought into a position wherein the axes of the rollers are aligned, or at least in a same plane, said plane preferably being at a distance below the pipeline, e.g. of at least 1 meter below the centreline of the pipeline, possibly between 1.5 and 3 meters.

In combination with outward tiltability of the rollers from said V-shape arrangement, it can also be envisaged that said rollers are movable translatory in vertical direction, so at right angles to the pipeline to increase the distance from the pipeline for assuming a position wherein the accessory can pass, preferably said position being such that the accessory is supported by said rollers.

An alternative embodiment wherein a pipeline support assembly includes rollers arranged in U-shape when supporting the pipeline, so with one or more bottom rollers and one or more side rollers at each side, may also be configured according to the invention. E.g. the side rollers are mounted outwards tiltable towards a retracted position, to move to said accessory support position when the accessory should pass. Also the bottom rollers, possibly in combination with the side rollers, can be mounted for vertical motion, so as to increase the distance from the pipeline.

In order to avoid that the stinger frame structure imposes undue restrictions on the accessory dimensions it is highly preferred that all the pipeline support assemblies are mounted on top of the stinger frame structure, preferably such that in the accessory support position of the pipeline support assembly no portion of the frame structure extends above the pipeline support assemblies, and even more preferably such that in the pipeline support position of the pipeline support assembly also no portion of the frame structure extends above the pipeline support assemblies. Thus, in no operative position of the pipeline support structure (so not in pipeline supporting position nor in the preferred accessory supporting position) a portion of the stinger frame structure extends above the pipeline support assemblies as it would then possibly form an obstacle for the accessory. It is noted that known stinger having multiple sections contain one section wherein this is provided, notably the section nearest to the hull, yet downstream thereof one or more sections are of the open-topped U-shape cross-section frame structure design, the path for the pipeline and the pipeline support roller assemblies being located within said U-shape.

The position actuators preferably are hydraulic actuators.

In another embodiment the stinger comprises movable pipeline support assemblies as well as accessory support assemblies distinct from said pipeline support assemblies, e.g. an accessory support assembly being arranged between adjacent pipeline support assemblies. Preferably the pipeline support assemblies are mobile as outlined above to a retracted position allowing the passage of the accessory, the accessory then being supported by one or more accessory support assemblies. Alternatively, or in addition, the accessory support assemblies are mobile to an elevated position allowing the passage of the accessory, the accessory then being supported by one or more accessory support assemblies. The accessory support assembly may be provided with one or more rollers or glide shoes engaging on a part of the accessory. It will be appreciated that the accessory support assembly may be configured mobile, so that the operative position of the accessory support assembly may be set depending on the accessory. E.g. the accessory support assembly includes on or more rollers defining a planar support plane for the accessory, the assembly allowing to set the spacing between said support plane and the centreline of the pipeline. It will be appreciated that an embodiment as outlined above where support assemblies have a double-function of both supporting the pipeline in one position and supporting the pipeline accessory in another position, may have practical advantages.

The invention also relates to an offshore S-lay pipelaying vessel for laying a pipeline on the seabed and allowing the passage of an accessory mounted on said pipeline having a cross-section greater than said pipeline diameter, said vessel comprising:
  a hull;
  an elongated stinger having a hull end and a free end, said hull end being attached to the hull of the vessel, said stinger being adapted to support the pipeline to be laid from the vessel,
wherein the stinger comprises a stinger frame, possibly composed of one or more rigid stinger frame sections, possibly articulated sections,
and wherein—distributed over the length of the stinger—multiple pipeline support assemblies are mounted that provide support for the pipeline.

Preferably the stinger includes one or more of the above-described features.

The invention also envisages the provision of an accessory support frame (e.g. as an item to be carried on board of the vessel or pre-assembled on shore with the accessory) adapted to cooperate with the stinger, the accessory being mountable on said accessory support frame, the accessory support frame then facing and preferably contacting the pipeline support assemblies of the stinger as the pipeline is launched.

In the field it is observed that accessories are made in widely differing designs. For instance no "format" exists for the design of the bottom side (the side facing the stinger) of such an accessory. Whilst many existing designs have a bottom side that is generally planar, so that it can be placed on the seabed, there are no rules or standards as concern the design of such a planar bottom side. One reason is that the design and built of such accessories is generally done without it being known or decided how the accessory will be laid with the pipeline and/or by which pipelaying vessel. Therefore it seems impractical in the field to demand for a standardization of the bottom side of the accessories.

The provision of a standardized accessory support frame to be used with a stinger, onto which the accessory is mounted, may overcome the above issue for many practical situations. Preferably the accessory support frame has a width of at least 3 meters, and the stinger is adapted for the passage of said accessory support frame over the stinger in a manner as outlined above.

For example the accessory support frame may be configured to have one or more rails at predetermined locations, said rails preferably extending parallel to the pipeline, and said rails contacting pipeline support assemblies of the stinger in their accessory supporting position. E.g. the frame comprises two rails spaced apart at least two meters in width direction in order to provide for a stable support of the accessory. It is noted that accessories may have a significant weight, with the centre of gravity being located well above the bottom side. This may result in the tendency of the accessory to tilt sideways, which is undesirable and imposed undue stresses on the pipeline.

In a known approach, e.g. with the vessel of WO2006/085739, a crane of the vessel is used to hold the accessory "upright". In a preferred pipelaying method it is envisaged that sideways tilting is only prevented by the rails and no use is made of a crane. Preferably, the draw works of the crane is used to support the accessory along the stinger.

Preferably the accessory support frame is adapted to be connected to the accessory in a disconnectable manner, e.g. by releasable connection means, e.g. by remote control and/or ROV operable connection means. This allows to retrieve the accessory support frame once the accessory has passed the free end of the stinger, e.g. the frame being connected to a retrieval cable.

In another variant the accessory support frame will remain on the accessory and be placed on the seabed.

In a possible embodiment the accessory support frame is adapted for automatic disconnection from the accessory at or near the free end of the stinger, e.g. the frame engaging a catch device at the free end of the stinger stopping its further motion and the accessory then releasing from the accessory support frame.

In a possible embodiment, when the vessel is equipped with a clamp and one or more tensioners as in WO2006/085739 with a station in between for fitting the accessory, the hull of the vessel—at said station and downstream to the hull end of the stinger—may be provided with hull support assemblies, e.g. with multiple rollers defining a planar support surface, e.g. movable in vertical direction to adjust to the size of the accessory, for supporting the bottom side of the accessory or the accessory support frame, thereby allowing to support the accessory during said passage. Again the use of a standardized frame will facilitate this option.

In a less preferred embodiment the accessory support frame is provided with rollers or glide shoes, the stinger being provided with rail elements, e.g. mobile rail elements, to contact said rollers/glide shoes as the accessory passes over the stinger. For instance the stinger then is provided with accessory support assemblies arranged at spaced longitudinal locations, e.g. between adjacent pipeline support assemblies, each accessory support assembly carrying multiple, e.g. two, parallel rail elements, e.g. the vertical position and/or the spacing between the rail elements being adjustable for cooperation with the rollers/glide shoes of the accessory support frame.

The invention e.g. allows to launch a "first end accessory", e.g. a first end PLET, fitted on the end of the pipeline that is to be launched first towards the seabed. In this method the first end accessory is placed on the accessory support frame and using said accessory support frame the accessory is passed over the stinger. As this during this method there is no pipeline suspended between the stinger and the seabed, the loads at play are fairly limited. This may allow for use of a stinger having rails contacting rollers or glide shoes of the accessory support frame. These rails may even be arranged at a fixed, non-adjustable position on the stinger (e.g. formed by longitudinal girder of the stinger structure), even when the result is that the trailing part of the pipeline is not supported in optimal fashion by the pipeline support assemblies of the stinger as the fixed position rails may cause the pipeline to follow a trajectory our of reach of the pipeline support assemblies. The accessory support frame may include a transverse pivot to allow for pivoting of the accessory about said axis so as to avoid overloading the connection to the pipeline.

For launching a "second end accessory", fitted on the end of the pipeline that is to be launched into the sea as last end, it is considered advisable to maintain an optimal support of the pipeline portion extending over the stinger as the second end accessory passes along the stinger, e.g. making use of a stinger and operation as outlined above.

A second aspect of the invention relates to a method wherein the stinger is tilted generally downwards, so that the stinger extends steeper downward and thus a lesser horizontal distance from the hull of the vessel than during normal pipelaying, in order to enable the launching of the pipeline portion with an accessory fitted thereto, in particular said accessory being fitted on the "second end" of the pipeline, which means on the end of the pipeline that leaves the vessel last. It is foreseen in this method that the weight of the pipeline suspended to the seabed is absorbed by a cable hoisting device, e.g. using a crane on the vessel, or the A&R cable and winch which are common for such pipelaying vessels.

In view of this method the second aspect provides for an offshore S-lay pipelaying vessel for laying a pipeline on the seabed, said vessel comprising:
  a hull;
  an elongated downward tiltable stinger having a hull end and a free end, said hull end being pivotally attached to the hull of the vessel, said stinger being adapted to support the pipeline to be laid from the vessel,
wherein the stinger comprises a stinger frame, possibly composed of one or more rigid stinger frame sections, possibly articulated sections.

Preferably the vessel is embodied with a tiltable accessory support device for supporting an accessory at a location on the vessel where the accessory is fitted to the pipeline, the tiltable accessory support device allowing to maintain the accessory in alignment with the pipeline when the stinger is tilted downwards.

In a possible embodiment the tiltable accessory support device is embodied as an extension of the hull sided end of the stinger, basically beyond the hull mounted pivot axis of the stinger. This is the axis via which the hull end of the stinger is pivotably attached to the hull.

The tiltable accessory support device can be integral with the stinger, or at least with the hull sided rigid stinger frame section, so that it automatically tilts along with the stinger (or said section).

In another embodiment the tiltable accessory support device is tiltable independent from the stinger, e.g. by associated actuator device, e.g. hydraulic, the actuator device at least allowing to maintain the accessory aligned with the pipeline when the stinger is tilted downwards.

Preferably the vessel is equipped with a pipeline clamp adapted to support the weight of the suspended pipeline, said pipeline clamp being tiltable along with the pipeline as the stinger is tilted. The clamp can be mounted on the stinger, e.g. the hull sided section, or on a separate tiltable base.

Preferably the pipeline clamp is mobile between an operative position, wherein the pipeline can be clamped, and a retracted position allowing the passage of the accessory which is fitted upstream of the clamp to the pipeline. The retracted position may be below the path of the pipeline and accessory, but it is also possible that the retracted position is to the side or above said path.

In a possible embodiment a clamp support structure is provided allowing the pipeline clamp with the pipeline suspended there from, so while being loaded, to be displaced such as to move the pipeline away from the downwardly tilted stinger in order to allow for the lowering of the accessory past the stinger, e.g. using a cable hoisting device.

The clamp support structure may be mounted on the stinger, e.g. the hull sided section thereof, or on the tiltable base of the pipeline clamp. The clamp support structure may also be mounted on the independently tiltable accessory support device—when present. The displacement of the loaded clamp may e.g. be done using a skidding arrangement.

Once the clamp has been operated to move the pipeline away from the stinger such that the accessory fitted thereon may pass along the stinger, the clamp can be released from the pipeline. The weight will then be absorbed by a cable hoisting device, e.g. the A&R cable, attached to the upper end of the pipeline and/or accessory, the pipeline with accessory then being lowered into the sea whilst passing the stinger, preferably at a distance so as to avoid contact with the stinger.

It will be appreciated that this approach can be implemented with a prior art stinger as the accessory is now not obstructed by the stinger as it is lowered into the sea.

In a preferred embodiment the vessel is equipped with an A&R system comprising a winch, possible sheaves and an A&R cable. Preferably, an additional sheave for an A&R cable at a location above the accessory mounted on said pipeline, preferably with the stinger and accessory held in steeply tilted orientation. This allows to use the A&R winch and cable for lowering the pipeline with accessory to the seabed.

In a possible embodiment, this A&R sheave is mounted on a trolley or the like adapted to displace the A&R sheave away from the hull of the vessel, e.g. during the tilting of the stinger downwards and/or during displacement of the pipeline by the clamp away from the stinger.

For instance the vessel may be equipped with a cantilever structure on the hull, extending over the hull sided end of the stinger above the waterline, said cantilever supporting this additional A&R sheave, preferably in the mobile manner mentioned above. The same cantilever can be used for the stinger suspension as is known in the art.

Alternatively, the jib of a crane present on the vessel may be used to support the additional A&R sheave, e.g. a mastcrane.

In a possible embodiment an additional A&R sheave is mounted on the tiltable accessory support device, possibly the vessel having one or more further A&R cable sheaves near the location of the tiltable accessory support device, to guide the A&R cable to said additional A&R sheave. This arrangement allows to connect the accessory to the A&R cable and then release the clamp, so that the pipeline can then be lowered with the A&R system, with the stinger and tiltable accessory support device being in (steeply) downward orientation.

In a further embodiment the A&R sheave may be mounted to be tilted into an "overboarding position" wherein the accessory and the pipeline are moved away from the support frame and the stinger, so that the pipeline with accessory can then be lowered. This can be done by having the A&R sheave mounted on the tiltable support device for the accessory and having it tiltable independent from the stinger, so that this device can be tilted into an overboarding position. In another embodiment the A&R sheave is mounted on a separate movable structure, e.g. a tiltable A-frame, allowing to bring the sheave in overboarding position.

It will be appreciated that the tiltable support device for the accessory can preferably also be brought in a horizontal position when the accessory has to be fitted to the pipeline and during normal pipelaying operation.

Known stinger connection assemblies are suitable to fixate the stinger frame sections in different orientations, depending on the pipelaying angle. A disadvantage of these known connection assemblies is that adjusting the orientation requires a complete disengagement of the stinger frame sections. This may complicate the entire operation, e.g. the re-connection in a different orientation.

According to an aspect of the present invention, the connection assembly comprises at least two overlapping connection elements, which are each pivotably connected to the respective stinger frame sections and pivotably connected to each other, and which may be fixed to each other in at least two different orientations, such that the orientation of the stinger frame sections can be varied without disconnection of the connection elements.

In a preferred embodiment, the connection assembly comprises at least two overlapping connection elements which are each provided with at least four holes, each adapted to removably receive a pin, the connection assembly comprising at least four such pins, wherein the pattern of the holes of the connection elements is such that:

two pins through two primary holes pivotably connect the connection elements to stinger holes in the stinger frame sections;

a pin through two secondary holes pivotably connect the connection elements to each other;

a pin through two tertiary holes fixates the connection elements to each other in a first orientation;

alternatively, a pin through two quaternary holes fixates the connection elements to each other in a second orientation.

The advantage of such a connection assembly is that the stinger frame sections remain always connected to each other during the change from one orientation to another. In particular, both stinger frame sections are pivotably connected via stinger holes and two pins to the first holes of the two connection elements. The two connection elements are pivotably attached to each other via a third pin through their second holes. As such, the stinger frame sections are connected to each other, and also pivotable with respect to each other to adopt any desired orientation. The third and fourth hole allow fixation of the stinger frame sections with respect to each other via the fourth pin at discrete orientations, where the holes of the two connection elements are in line with each other.

In an advantageous operation the stinger frame sections are connected to each other in a first orientation. Thus, the two connection elements are pivotably connected to the respective frame sections and to each other, and the fixation pin through two tertiary holes fixates the connection elements with the stinger frame sections in a first orientation. Once the fixation pin is removed, a crane is used to support the distal section. Now the stinger sections and the two connection elements are pivotable to a certain degree with respect to each other, as only three pivotable connections remain. Advantageously, the orientation of the holes is such that the connection assembly pivots by its own weight such that the two quaternary holes are in line. Once the quaternary holes are in line, the fixation pin is inserted through the two quaternary holes to fixate the connection elements and thus the stinger frame sections to each other in a second orientation.

Known stinger suspension winches are fixedly mounted to the hull of the vessel. The stinger may be removable for sailing with the vessel, docking of the vessel, or other purposes. A disadvantage of such vessels is that prior to the removal of the stinger, the stinger suspension cables need to be removed from the stinger sheaves. This is a time-consuming process.

According to an aspect of the present invention, a detachable stinger mounting unit is provided, comprising a stinger suspension cable winch and sheaves, wherein the hull end of the stinger is pivotably attached to the detachable stinger mounting unit, and wherein the detachable stinger mounting unit is detachably mounted to the hull of the vessel, preferably the stern of the vessel, the detachable stinger mounting unit further comprising stinger suspension cables which are reeved between the sheaves of the stinger mounting unit and the stinger sheaves, and are connected to the stinger suspension cable winch.

The advantage of such a detachable stinger mounting unit is that the stinger suspension cables can remain reeved through the sheaves. In particular, by hauling the stinger suspension cable, the stinger sheaves are pivoted towards the sheaves of the stinger mounting unit, forming a compact ensemble of stinger and stinger mounting unit. Preferably, a seafastening rod is provided, connecting the stinger to the stinger mounting unit to form the compact ensemble in a rigid way. As the stinger is mounted to the stinger mounting unit, upon detachment of the stinger mounting unit from the vessel, both the stinger and the stinger suspension winch, including sheaves and cables, is removable for transport or other purposes, In an advantageous embodiment, the stinger is composed of at least two articulated stinger frame sections, a hull end section and a distal section which are connected to each other via at least one connection assembly. The stinger sheaves may be mounted to the hull end section, close to the connection assembly, or alternatively the stinger sheaves are mounted to the connection assembly.

In known stinger suspension systems the cable sheaves of the stinger mounting unit are fixed to the stinger mounting unit. Commonly, the cable sheaves are mounted fixedly with respect to the hull of the vessel, or to a separately provided stinger mounting unit.

In certain seastates, it is possible that uplift might occur. In general, the design of the stinger is such that the expected occurrence of uplift, e.g. as a result of freak waves, is very limited. When uplift occurs, the stinger is lifted and the stinger suspension cables can hang slack. When the cables are slack, there is a risk that the cable jumps out of the sheaves, which is very unwished-for. It is common to take measures to ensure that the cable jumps from one sheave to another, e.g. by the application of plates and cable retainers between all sheaves.

Another disadvantage of uplift is that when a cable is slack due to the uplift, a shock load will occur in the tackle when the stinger falls back again.

By providing the stinger mounting unit with a stinger suspension cable tensioning system, the cable is tensioned, preventing the cable from being slack. As a result, the stinger can be uplifted a certain amount (depending on the tension on the cable) without the cable is hanging slack. With higher uplift situations, the stinger suspension cable tensioning system reduces the amount of slack cable and thus reduces the shock load.

Preferably, a resilient suspension system for the cable sheaves of the stinger mounting unit is provided. In particular, a resilient suspension system is preferred which comprises a pivotable connection member which is pivotably attached to the stinger mounting unit, and a spring, e.g. a gas spring, one end of which is pivotably connected to the stinger mounting unit, the other end of which is pivotably attached to the connection member, wherein the cable sheaves of the stinger mounting unit are pivotably connected to the connection member.

Preferably, multiple springs, e.g. gas springs, are provided. If one spring fails, other springs are capable of reducing shock loads.

In a preferred embodiment, the resilient suspension system for the cable sheaves of the stinger mounting unit comprises a hydraulic system. The advantage of a hydraulic system is that a minimum amount of moving parts is required, improving reliability. In addition, if the hydraulic system fails, an oveflow valve will be opened and the system will act as if no resilient suspension system for the cable sheaves of the stinger mounting, and thus no stinger suspension cable tensioning system is provided.

The hydraulic system is preferably coupled to a cylinder equipped with compressible N2 tanks, which ensure that the cylinder acts as a progressive cylinder. During normal operations, the cylinder will be pushed in as the load in the tackle exceeds a certain threshold value, e.g. >500t. If during dynamics the tackle loads gets below this threshold value, the cylinder will start to pay out. At the end of the stroke of the cylinder, there is a much lower load in the tackle, e.g. 200t.

Figure 2B:
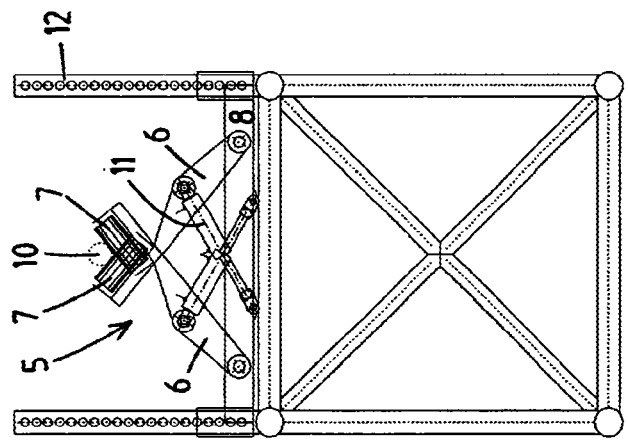
Figure 2A:
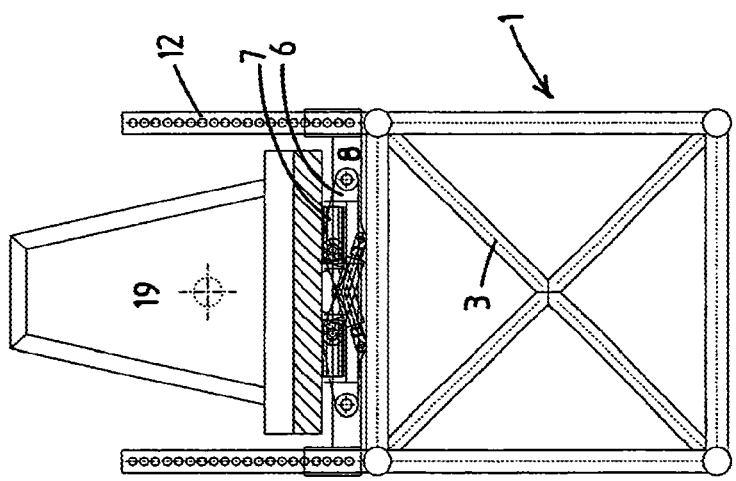
Figure 3A:
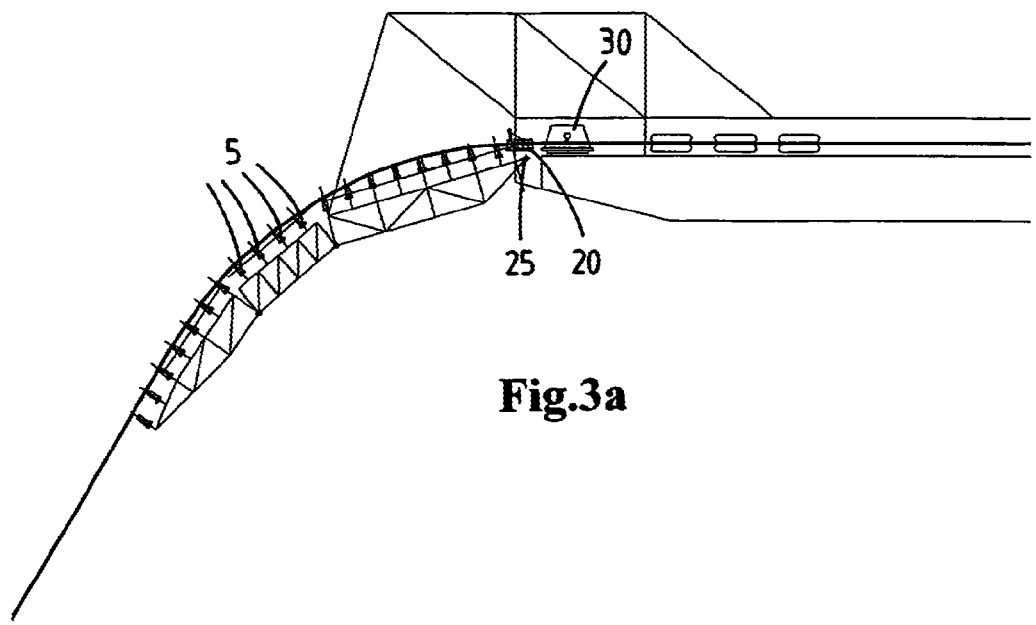
Figure 3B:
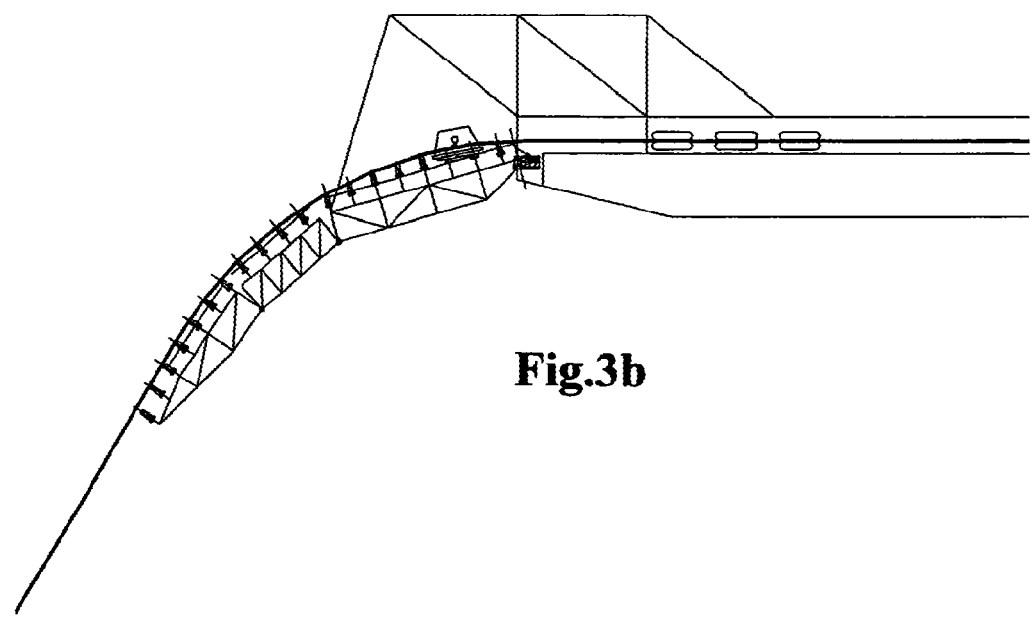
Figure 4A:
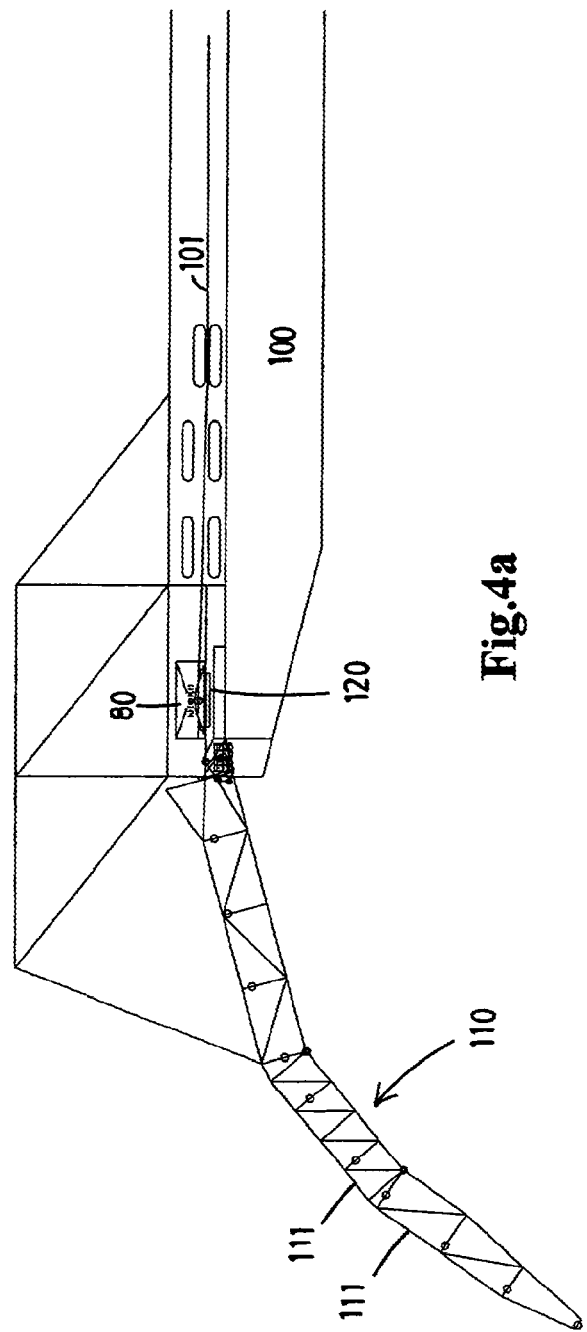
Figure 4B:
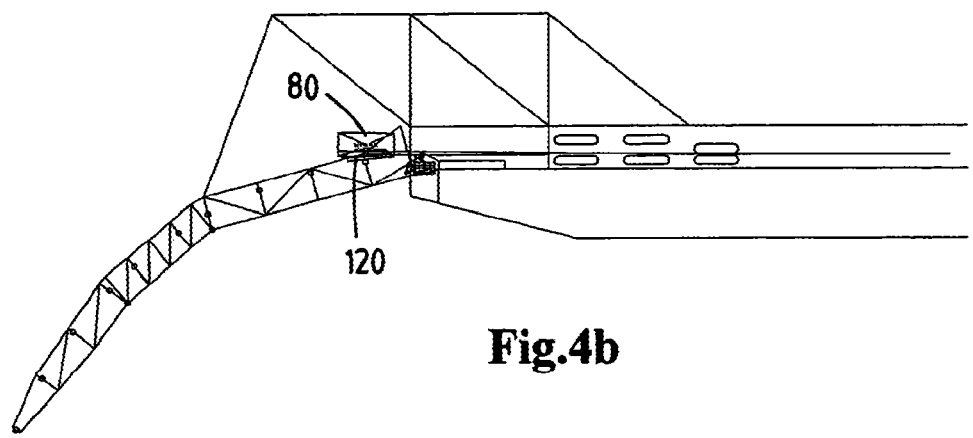
Figure 4C:
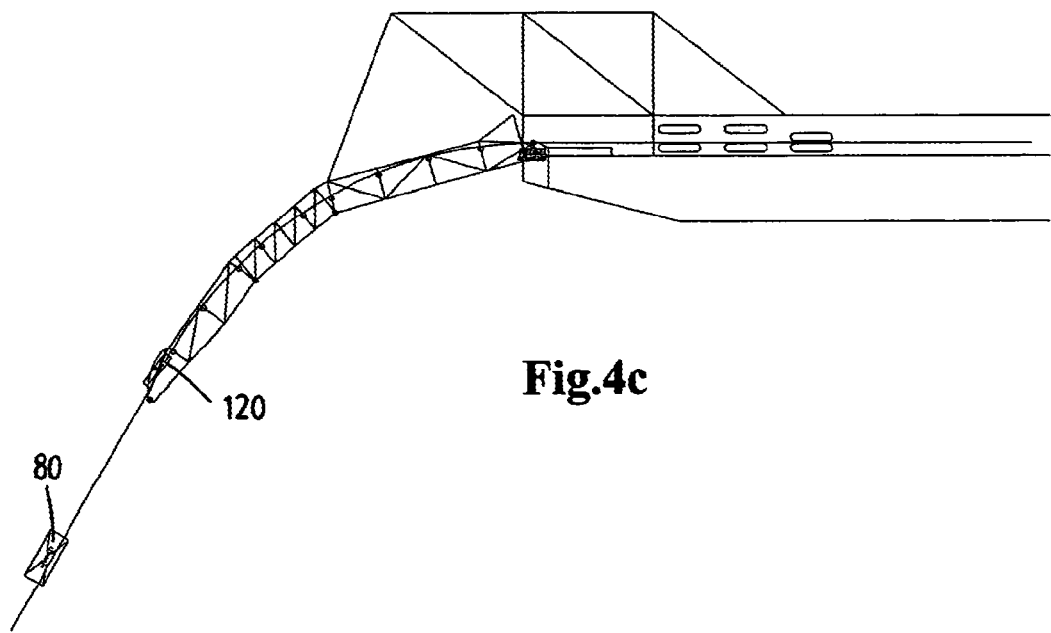
Figure 6A:
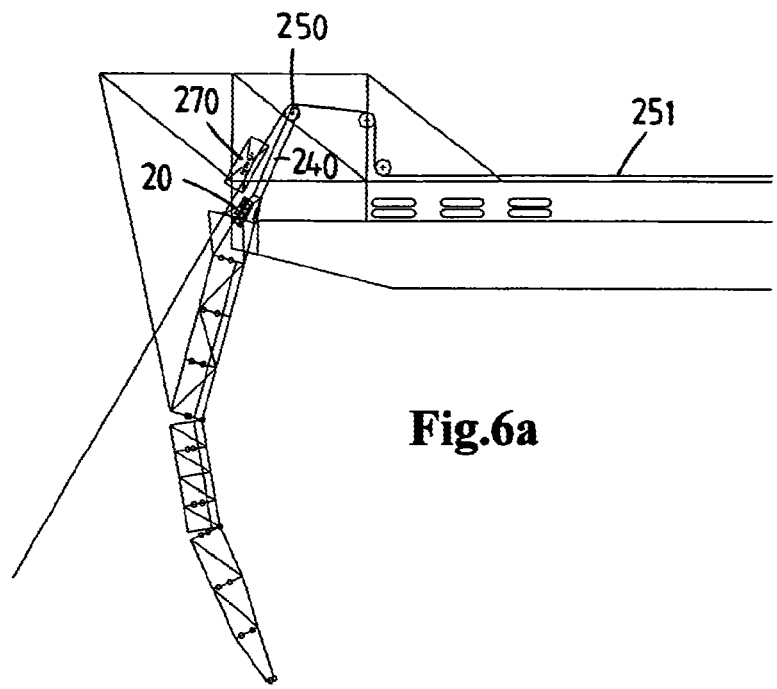
Figure 6B:
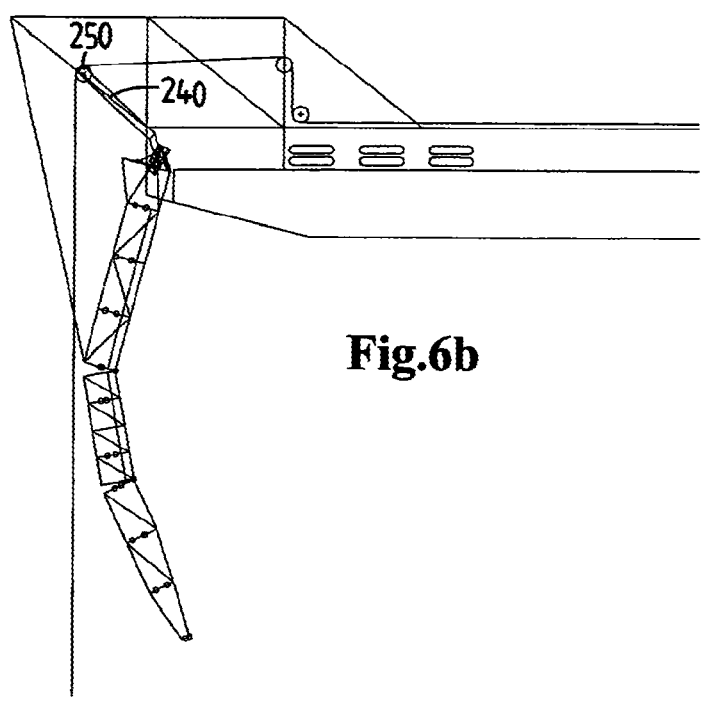
Figure 7:
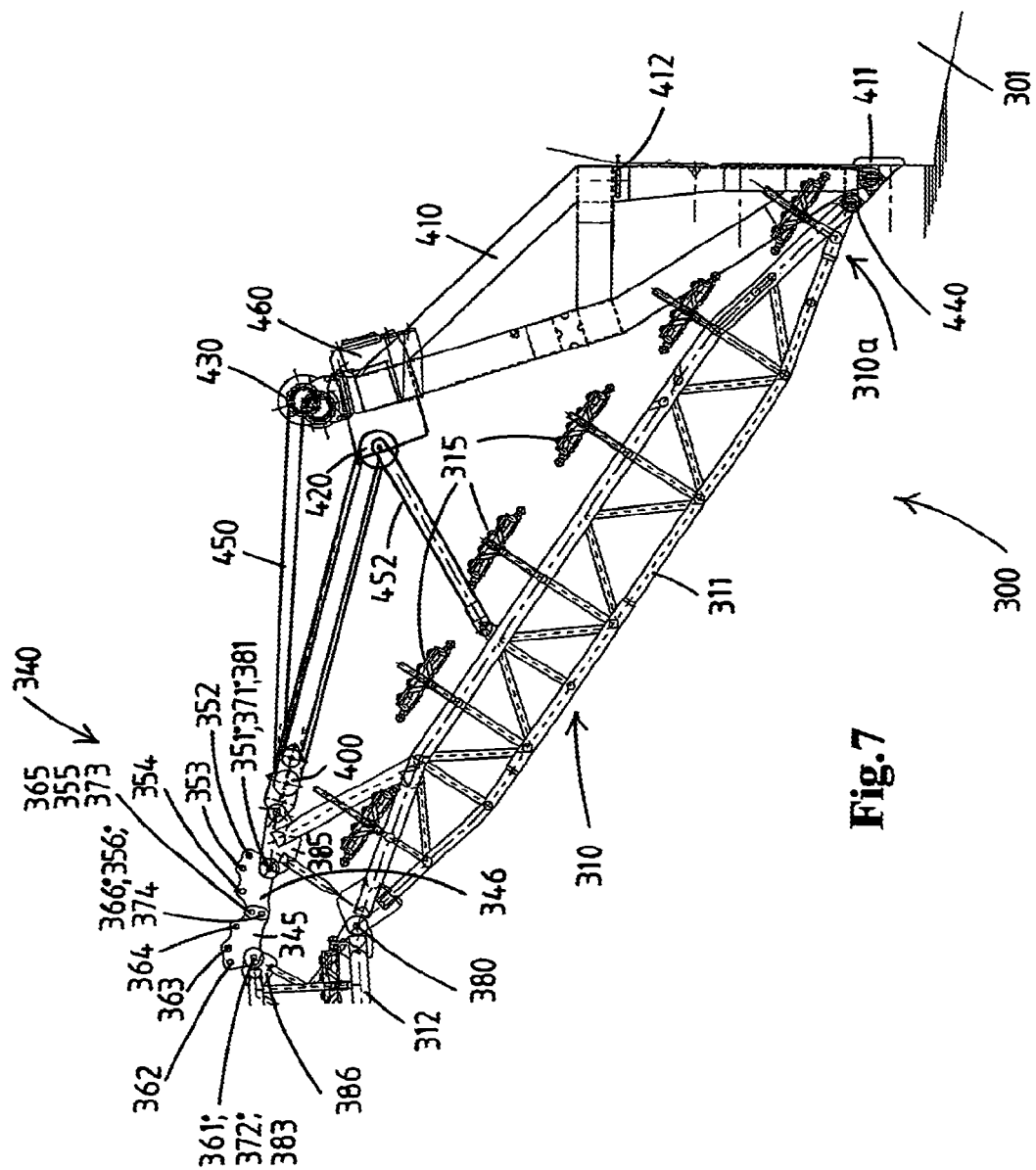
Figure 8:
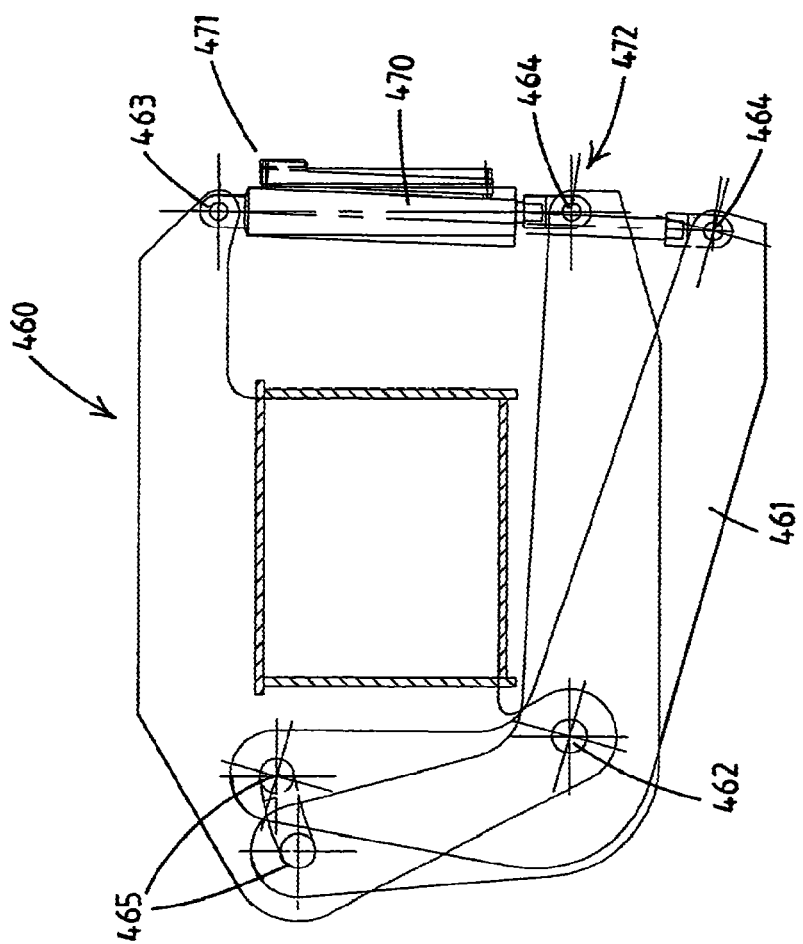
Figure 9A:
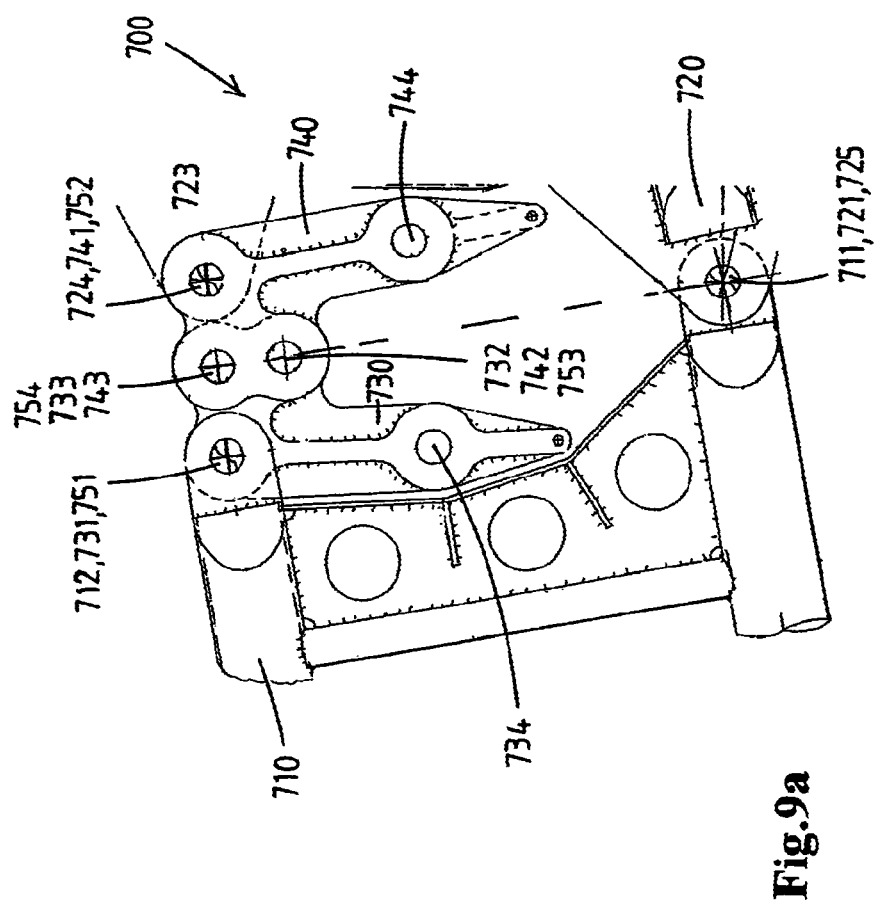

The aspects of the invention will now be explained with reference to the appended drawings. In the drawings:

FIG. 1 shows schematically in cross-section a portion of a hull of a vessel with a stinger including pipeline support assemblies according to the first aspect of the invention;

FIGS. 2a-c show schematically in cross-section an example of a stinger and pipeline support assembly according to the first aspect of the invention, FIGS. 3a-3b schematically illustrate the launching of a pipeline with an intermediate accessory in said pipeline according to the first aspect of the invention;

FIGS. 4a-4c schematically illustrate an alternative launching of a pipeline with an intermediate accessory in said pipeline according to the first aspect of the invention;

FIGS. 5a-5d schematically illustrate the launching of a pipeline with an intermediate accessory in said pipeline according to the second aspect of the invention;

FIGS. 6a-6b schematically illustrate an alternative launching of a pipeline with an intermediate accessory in said pipeline according to the second aspect of the invention;

FIG. 7 schematically illustrates in cross-section a portion of a hull of a vessel with a stinger including a stinger mounting unit, connection elements and a stinger suspension cable tensioning system according to various aspects of the invention;

FIG. 8 shows a preferred embodiment of the stinger suspension cable tensioning system in more detail;

FIGS. 9a, b shows an alternative embodiment of the connection assembly in more detail.

The stinger 1 is an S-lay stinger for use with an offshore S-lay pipelaying vessel for laying a pipeline on the seabed. Such a vessel comprises a hull 2, the elongated stinger having a hull end 1a and a free end 1b, said hull end 1a here being attached to the hull 2 of the vessel, commonly pivotally, said stinger being adapted to support a pipeline 10 to be laid from the vessel.

The stinger comprises a stinger frame 3, which is in this embodiment composed of three pivotally interconnected rigid stinger frame sections 3', 3" and 3''', which are possibly articulated sections.

Distributed over the length of the stinger—multiple pipeline support assemblies 5 are mounted that provide support for the pipeline.

In the shown situation, the pipeline is held by tensioners 50, provided on the hull of the vessel. Also, a clamp 20 is provided to alternatively support the weight of the suspended pipeline.

A gantry construction 21 is provided on the hull, which in the shown embodiment supports the hull end stinger frame section 3'.

In FIGS. 2a-c a preferred embodiment of the stinger 1 and pipeline support assembly 5 are shown in more detail. In FIG. 2a the pipeline support assembly 5 supports an accessory 19 in an accessory support position, in FIG. 2b the pipeline support assembly supports a pipeline 10 in a lowered pipeline support position, and in FIG. 2c the pipeline support assembly 5 supports a pipeline 10 in an elevated pipeline support position.

In this example two pivotal arms 6 each support one or more rollers 7, the rollers 7 being arranged in a V-shape when supporting a pipeline 10 as visible in FIGS. 2B and 2C.

The arms 6 are pivotally mounted on a vertically movable base member 8 mounted on top of the rigid stinger structure 3. In the shown embodiment vertical guides 12 are provided between which the base 8 vertically translated. Alternatively, not shown, a hydraulic actuator is provided to effect vertical motion. In this situation, the vertical guides 12 may be dispensed with.

For each arm 6 a corresponding actuator 11 is provided, allowing to pivot the arm with respect to the base member 8, e.g. by hydraulics. This allows to bring these rollers 7 from the V-shaped pipeline supporting position as shown in FIGS. 2B and 2C into an accessory support position as shown in FIG. 2A, here by tilting downwards, e.g. to a position wherein the rollers contact the bottom side, e.g. guide rails on the bottom side, of the accessory.

As is preferred the actuators are remotely operable from the vessel, preferably a control system being provided controlling the operation of all position actuators.

The mobility of the arms 6 and base member 8 in this example allows to move the pipeline support rollers 7 away from the pipeline 10 supported by the stinger to allow for the passage of an accessory mounted on said pipeline having a cross-section greater than said pipeline diameter and after said accessory has passed the pipeline support assembly moving said assembly back to the position wherein it supports the pipeline.

It is noted that in FIG. 2A the size of the accessory 19 is so small that it fits between guides 12, and that it is being supported while the base 8 is at the lowest position. In FIG. 2C the pipeline is supported with the base 8 in the elevated position. It is conceivable that when larger accessories are to be handled, the arms 6 are in the accessory support position as indicated in FIG. 2A, while the base is in the elevated position as in FIG. 2C. As such, the accessory is allowed to extend over the guides 12. Hence, the pipeline support assembly is in the accessory support position when the rollers are in the horizontal position, and the base can be either in the elevated or the lowered position. The pipeline support assembly can be in the pipeline support position also with the base 8 at a lowered or elevated position.

Preferably the vessel has a control system adapted to perform this operation in automated manner, e.g. based on input representative of the actual position of the accessory along the stinger.

This procedure is schematically depicted in the sequence of FIGS. 3a-3b.

In FIGS. 1 and 3a all pipeline support assemblies 5 are in the pipeline supporting position.

In FIG. 3a it is depicted that the pipeline is held by a clamp 20, at, near or upstream of the hull side end of the stinger 1; the pipeline has been severed, and an accessory 30 is fitted to the pipeline end held by the clamp. It is now visible that in the shown embodiment the hull end 1a of the stinger is pivotally attached to the stern of the vessel via pivot axis 25.

As can be seen in FIG. 3b the pipeline held by tensioners 50 is fitted to the other end of the accessory 30 and the clamp 20 is released from the pipeline as the weight of the suspended pipeline is now absorbed by the tensioners 50. It is clear that in this embodiment the accessory 30 is an intermediate accessory, connected with both ends to a pipeline.

In FIG. 3b the accessory 30 moves onto and over the stinger 1 as explained with respect to FIGS. 2a-2c. Upon arrival of the accessory 30 at a pipeline support assembly 5, said assembly 5 is operated, here such that the rollers 7 are brought down to a position wherein the form a planar support surface for the accessory, vertically spaced from the pipeline, the vertical spacing possibly also being set by vertical motion of base member 8.

After the accessory 30 has passed an assembly 5, the rollers 7 are brought back into pipeline engaging position. This results in a somewhat peristaltic effect of the assemblies 5 on the stinger 1 as the accessory passes over the stinger when the pipeline is lowered under control of the tensioners 50, until the accessory is into the sea.

As is preferred the pipeline support assemblies 5 can be brought into an accessory position wherein axis are aligned, or at least in a same plane, said plane being at a distance below the pipeline, e.g. of at least 1 meter below the centreline of the pipeline, possibly between 1.5 and 3 meters.

As shown here in combination with tiltability of the rollers from said V-shape arrangement, the rollers are movable translatory in vertical direction, so at right angles to the pipeline to increase the distance from the pipeline for assuming a position wherein the accessory can pass, preferably said position being such that the accessory is supported by said rollers.

FIG. 4a schematically illustrates an S-lay pipelaying vessel 100 with stinger 110.

In more detail use is made here of a stinger 110 having rails 111 contacting rollers or glide shoes of an accessory support frame 120, supporting accessory 80, here as preferred a first end accessory of the pipeline 101 to be laid.

The rails 111 are arranged at a fixed, non-adjustable position on the stinger 110 (e.g. formed by longitudinal girder of the stinger structure), even when the result is that the trailing part of the pipeline is not supported in optimal fashion by the pipeline support assemblies of the stinger as the fixed position rails may cause the pipeline to follow a trajectory our of reach of the pipeline support assemblies.

The FIGS. 4b and 4c depict the passage of the frame 120 and accessory 80 over the stinger. It is envisaged that the frame 120 is disconnected from the accessory upon or after reaching the end of the stinger, the frame 120 then being retrieved, e.g. via a cable.

Figure 5A:
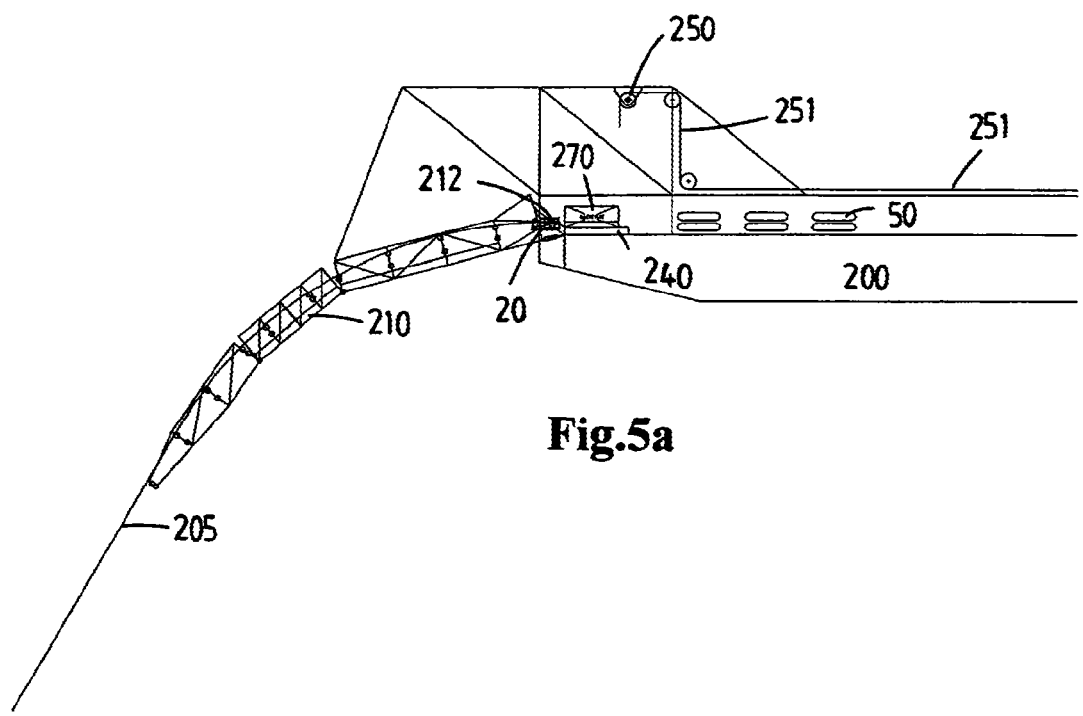

FIG. 5a illustrates schematically an embodiment of the second aspect of the invention. The S-lay vessel 200 with pivotal stinger 210 (via pivot attachment 212) has tensioners 50, clamp 20, and tiltable accessory support device 240. An A&R system is provided (not shown), and an additional A&R sheave 250 for A&R cable 251 is mounted at an elevated position above and in the vicinity of the hull end of the stinger.

Figure 5B:
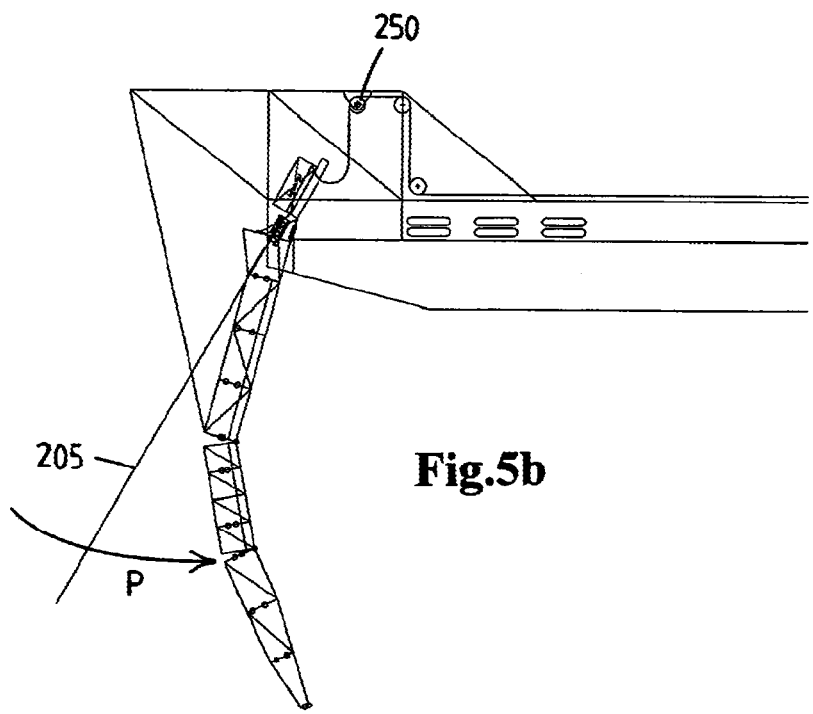

When fitting a second end accessory 270 to the pipeline 205, the method to pass the accessory over the stinger involves tilting the stinger in direction P to a downward directed orientation, see FIG. 5b.

In order to maintain the accessory 270 aligned with the pipeline 205, the accessory support device 240 also is tilted. During the tilting of the stinger, the clamp 20, which is also tilted, holds the pipeline. Thereafter the A&R cable 251 is fastened to the accessory 270 and the weight taken over by the A&R cable and A&R winch so that the clamp 20 is released.

The clamp 20 is mounted on the stinger in this example. It is foreseen that the clamp 20 is mounted to be displaceable under load to bring the pipeline and accessory away from the stinger, e.g. on support structure 290. However, this is not a prerequisite when the A&R sheave is mounted moveable along a gantry.

Figure 5C:
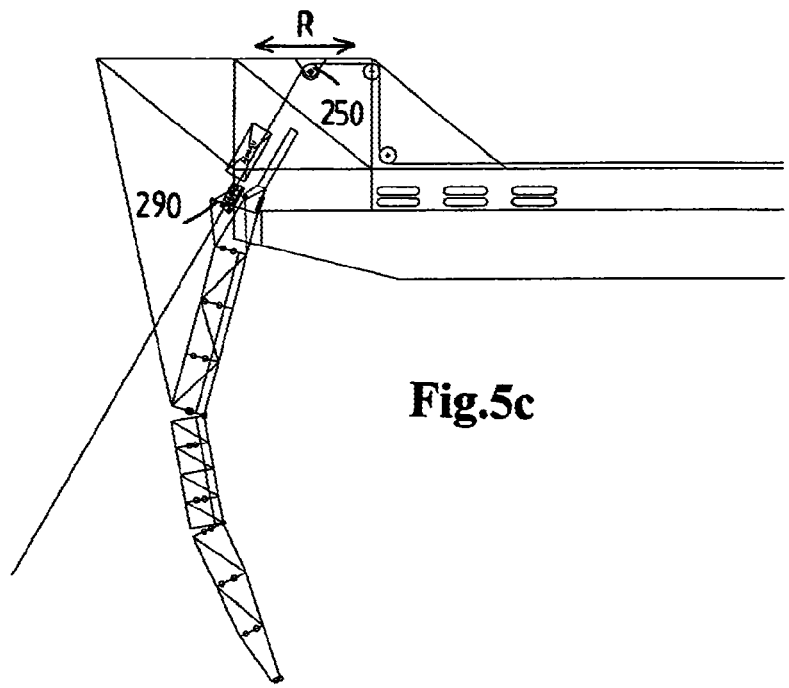
Figure 5D:
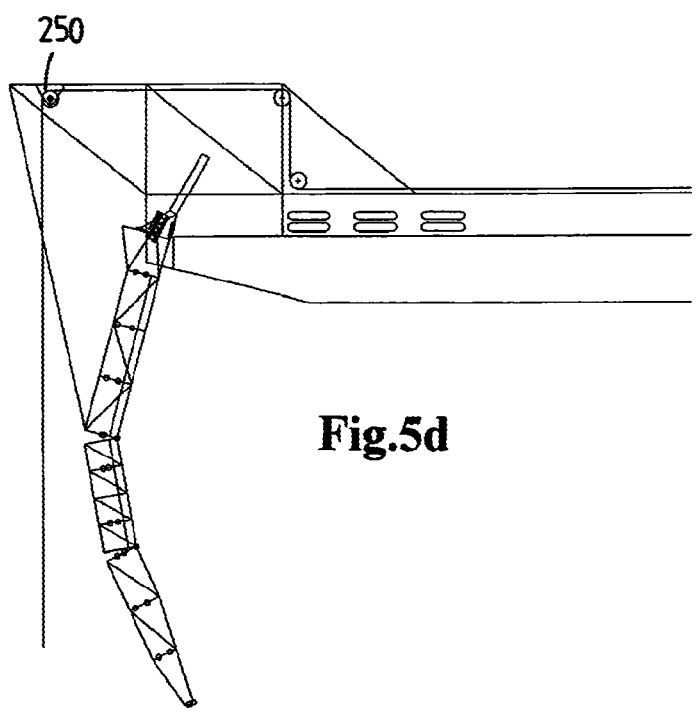

A suitable arrangement of the sheave 250, possibly mobile in direction R as shown in FIG. 5c, displacement under load to a further outward position with respect to the vessel is allowed, which causes the pipeline and accessory to be moved away from the stinger. After subsequent retraction of the clamp 20, the pipeline can be lowered as is visible in FIG. 5d.

FIG. 6a depicts a further embodiment wherein the additional A&R sheave 250 is fitted in the device 240.

In FIG. 6b the additional A&R sheave 250 is shown to be brought, with the device 240, into overboarding position.

In FIG. 7 a portion of an offshore S-lay pipelaying vessel 300 for laying a pipeline (not shown) on the seabed is shown. The vessel 300 comprises a hull 301, of which only the stern portion is shown.

The vessel 300 further comprises an elongated stinger 310, of which only a portion is shown. The stinger comprises a hull section 311, comprising the hull end 310a of the stinger, which is connected to the hull. The stinger further comprises a distal section 312, comprising a free end (not shown) of the stinger. Multiple pipeline support assemblies 315 are mounted to the stinger frame, which provide support for the pipeline.

The hull section and distal section are connected to each other via at least one connection assembly 340, which is suitable to fixate the stinger frame sections 311 and 312 in at least two different orientations. The hull section 311 and distal section 312 are also connected to each other via pivot axis 380.

In FIG. 7 one connection assembly 340 is visible, as this is a side view. In a perspective view one would notice that in this embodiment two parallel connection assemblies are provided.

The shown connection assembly 340 comprises two overlapping connection elements 345, 346, which are each provided with six holes 351, 352, 353, 354, 355, 356 and 361, 362, 363, 364, 365, 366. Each of the holes is adapted to removably receive a pin. The connection assembly 340 comprises four such pins 371, 372, 373, 374. The pattern of the holes of the connection elements 345, 346 is such that:

two pins 371, 372 through two primary holes 351, 361 pivotably connect the connection elements 345, 346 to stinger holes 381, 382 in the stinger frame sections 311 and 312 respectively;

a pin 373 through two secondary holes 355, 365 pivotably connect the connection elements 345, 346 to each other;

a pin 374 through two tertiary holes 356, 366 fixates the connection elements 345, 346 to each other in a first orientation;

alternatively, when pin 373 is inserted through two quaternary holes 354 and 364 the connection elements 345, 346 are fixed to each other in a second orientation;

alternatively, when pin 373 is inserted through two quinary holes 352 and 362 the connection elements 345, 346 are fixed to each other in a third orientation;

alternatively, when pin 373 is inserted through two senary holes 353 and 363 the connection elements 345, 346 are fixed to each other in a fourth orientation.

It is noted that the stinger frame sections 311 and 312 comprise auxiliary elements 385, 386 in which the stinger holes 381, 382 are provided.

To adapt the stinger radius, the upper connection pin 373 is removed, and the distal segment is being held and lifted/lowered by a crane. The connection elements 345, 346 will pivot as a result of their own weight, or alternatively the pivoting is guided, to a position in which the next set of holes comes in line with each other, to receive the connection pin 373. The connection elements remain pivotably connected to each other at all times via pin a pin 374 through two secondary holes 366, 356.

Stinger sheaves 400 are mounted to the stinger 310, remote from the hull end 310a of the stinger. In the embodiment shown in FIG. 7, the stinger sheaves 400 are mounted to the auxiliary element 385 of the hull section 311, to which also the connection element 346 is mounted.

According to an aspect of the invention the invention, a detachable stinger mounting unit 410 is provided, comprising a stinger suspension winch 420 and sheaves 430. The hull end of the stinger 310a, in this example the hull end 310a of the hull section 311, is pivotably attached via pivot axis 440 to the detachable stinger mounting unit 410.

The detachable stinger mounting unit 410 is detachably mounted to the hull 301 of the vessel, here the stern of the vessel, via mountings 411, 412. Stinger suspension cables 450 are reeved between the winches 420, sheaves 430 of the stinger mounting unit and the stinger sheaves 400.

The detachability allows installation and de-installation of the stinger, without requiring the tackle system to be disconnected. This is in particular advantageous when the vessel is also provided with a heavy lift crane, in particular a heavy lift mast crane.

In the situation shown in FIG. 7, the stinger suspension cable 450 is hauled such that the stinger hull section 311 is pivoted close to the stinger mounting unit 410, ready for transport. To fixate the stinger to the stinger mounting unit in a more rigid way than via the stinger suspension cable 450 alone, a sea fastening rod 452 is provided.

According to an aspect of the invention, the stinger mounting unit 410 is provided with a stinger suspension cable tensioning system 460, preferably comprising a resilient suspension system for the cable sheaves 430 of the stinger mounting unit 410.

In FIG. 8 a preferred resilient suspension system 460 is shown in more detail. The resilient suspension system 460 comprises a pivotable connection member 461 which is pivotably attached to the stinger mounting unit 410 via pivot axis 462. The connection member 461 is shown in two positions in FIG. 8. The resilient suspension system 460 further comprises a spring 470. One end 471 of the spring is pivotably connected to the stinger mounting unit 410 via pivot axis 463, the other end 472 of the spring is pivotably attached to the connection member 461 via pivot axis 464, in FIG. 8 shown in two positions. The cable sheaves 430 of the stinger mounting unit 410 are pivotably connected to the connection member 461 via pivot axis 465, here also shown in two positions.

In FIGS. 9a, b an alternative connection assembly 700 is shown in three different positions. The connection assembly 700 is suitable to fixate stinger frame sections in at least two different orientations.

Only a portion of the stinger frame sections is visible: a distal section 710 and a hull section 720. The distal section 710 comprises two holes 711, 712. The hull section 720 comprises a hole 721, an auxiliary element 722, and a second auxiliary element 723 which is provided with a hole 724.

The connection assembly 700 comprises two overlapping connection elements 730, 740, which are each provided with four holes 731, 732, 733, 734 and 741, 742, 743, 744. Each of the holes is adapted to removably receive a pin. The connection assembly 340 comprises four such pins 751, 752, 753, 754.

The distal section and the hull section are pivotably connected to each other via holes 711, 721 and a pin 725.

The pattern of the holes of the connection elements 730, 740 is such that:
- two pins 751, 752 through two primary holes 731, 741 pivotably connect the connection elements 730, 740 to stinger holes 712, 724 in the stinger frame sections and respectively;
- a pin 753 through two secondary holes 732, 742 pivotably connect the connection elements 730, 740 to each other;
- a pin 754 through two tertiary holes 733, 743 fixates the connection elements 730, 740 to each other in a first orientation, as is visible in FIG. 9a.

Figure 9B:
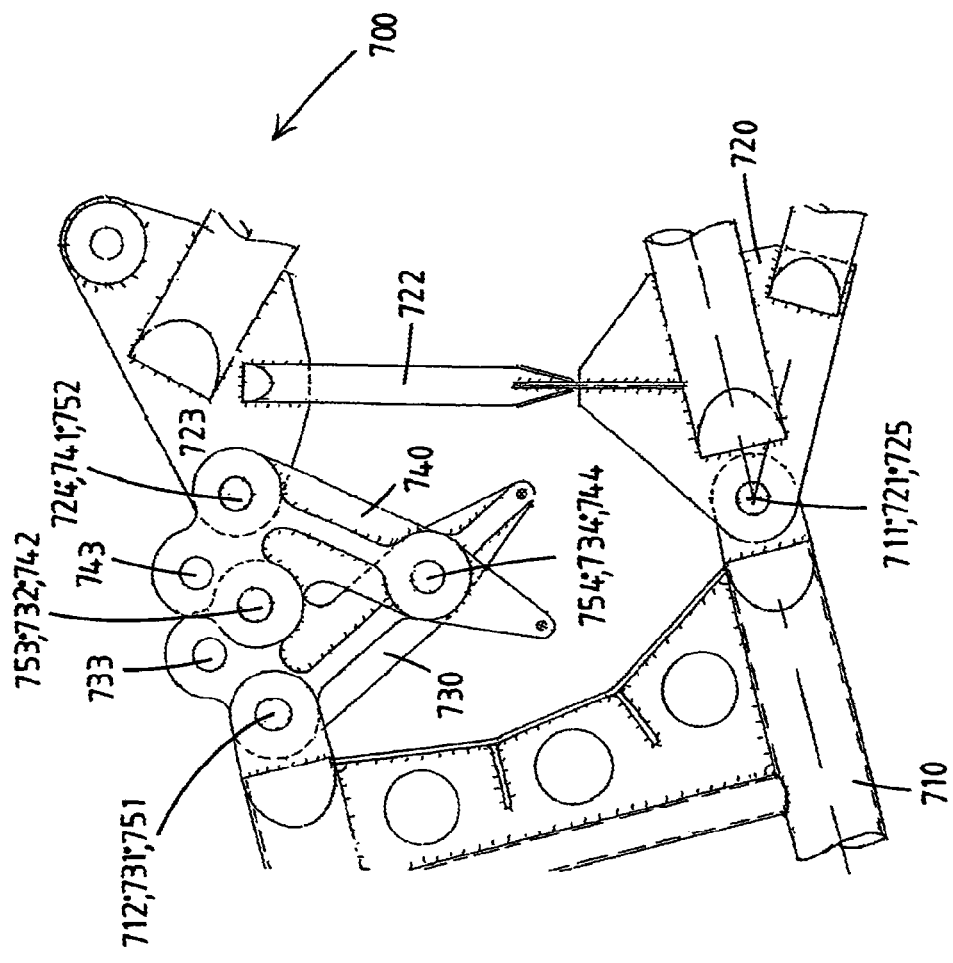

In FIG. 9b, pin 754 is inserted through two quaternary holes 734, 744, fixing the connection elements 730, 740 in a second orientation to each other.

The invention claimed is:

1. An offshore S-lay pipelaying vessel for laying a pipeline on the seabed comprising:
   a hull;
   an elongated stinger having a hull end extending a horizontal distance from the hull of the vessel and a free end, said stinger being adapted to support the pipeline to be laid from the vessel,
      wherein the stinger comprises a rigid stinger frame structure, and
      wherein stinger sheaves are mounted to the stinger remote from the hull end of the stinger;
   a detachable stinger mounting unit comprising:
      a frame which is detachably mounted to the hull of the vessel; and
      a stinger suspension cable winch and sheaves provided in the frame; and
   stinger suspension cables which are reeved between the sheaves of the stinger mounting unit and the stinger sheaves, and are connected to the stinger suspension cable winch,
      wherein the hull end of the stinger is pivotally attached to the frame of the detachable stinger mounting unit, and
      wherein the combination of the stinger and detachable stinger mounting unit is configured to be installed and de-installed without requiring the stinger suspension cables to be disconnected from the stinger or detachable stinger mounting unit.

2. The vessel according to claim 1, wherein the stinger is composed of at least two articulated stinger frame sections, a hull end section and a distal section which are connected to each other via at least one connection assembly, and wherein the stinger sheaves are mounted to the hull end section, close to the connection assembly.

3. The vessel according to claim 1, wherein the stinger is composed of at least two articulated stinger frame sections, a hull end section and a distal section which are connected to each other via at least one connection assembly, and wherein the stinger sheaves are mounted to the connection assembly.

4. A method for S-lay pipelaying of an offshore pipeline, including the installation and removal of a stinger, with the vessel according to claim 1.

5. The vessel according to claim 1, furthermore comprising a sea fastening rod to fixate the stinger to the stinger mounting unit.

6. The vessel according to claim 1, wherein the stinger mounting unit is provided with a stinger suspension cable tensioning system.

7. The vessel according to claim 6, wherein the stinger suspension cable tensioning system is a resilient suspension system for the cable sheaves of the stinger mounting unit.

8. An offshore S-lay pipelaying vessel for laying a pipeline on the seabed comprising:
   a hull;
   a heavy lift crane;
   an elongated stinger having a hull end extending a horizontal distance from the hull of the vessel and a free end, said stinger being adapted to support the pipeline to be laid from the vessel,
      wherein the stinger comprises a rigid stinger frame structure, and
      wherein stinger sheaves are mounted to the stinger remote from the hull end of the stinger;
   a detachable stinger mounting unit comprising:
      a frame which is detachably mounted to the hull of the vessel; and
      a stinger suspension cable winch and sheaves provided in the frame
   stinger suspension cables which are reeved between the sheaves of the stinger mounting unit and the stinger sheaves, and are connected to the stinger suspension cable winch,
      wherein the hull end of the stinger is pivotably attached to the frame of the detachable stinger mounting unit, and
      wherein the combination of stinger and detachable stinger mounting unit is configured to be installed and de-installed without requiring the stinger suspension cables to be disconnected from the stinger or detachable stinger mounting unit.

9. The vessel according to claim 8, furthermore comprising a sea fastening rod to fixate the stinger to the stinger mounting unit.

10. The vessel according to claim 8, wherein the stinger mounting unit is provided with a stinger suspension cable tensioning system.

11. The vessel according to claim 10, wherein the stinger suspension cable tensioning system is a resilient suspension system for the cable sheaves of the stinger mounting unit.

12. The vessel according to claim 8, wherein the stinger is composed of at least two articulated stinger frame sections, a hull end section and a distal section which are connected to each other via at least one connection assembly, and wherein the stinger sheaves are mounted to the hull end section, preferably close to the connection assembly.

13. The vessel according to claim 8, wherein the stinger is composed of at least two articulated stinger frame sections, a hull end section and a distal section which are connected to each other via at least one connection assembly, and
wherein the stinger sheaves are mounted to the connection assembly.

14. A method for S-lay pipelaying of an offshore pipeline, including the installation and removal of a stinger, with the vessel according to claim 8.

* * * * *